Figure 1:
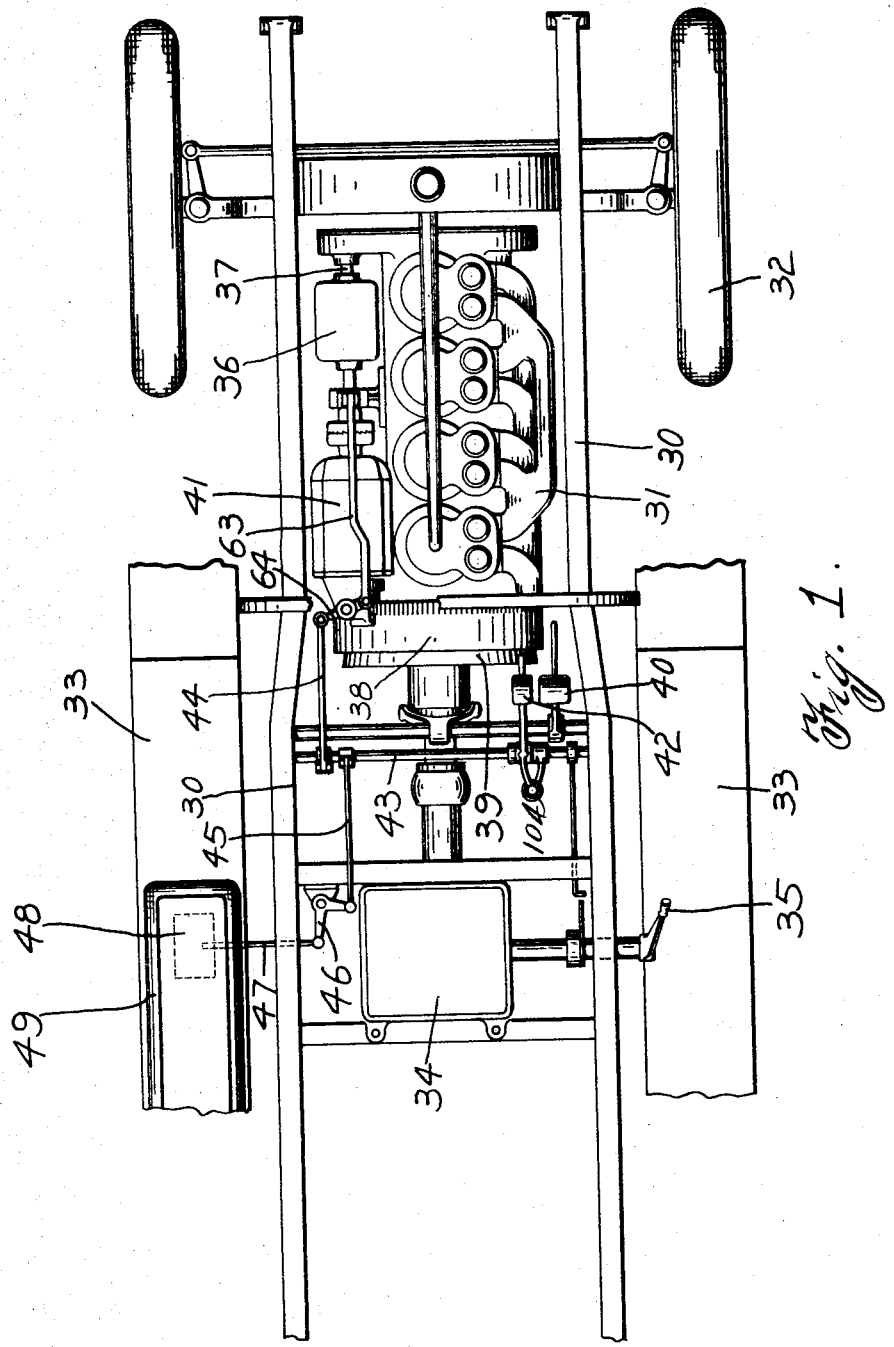

C. F. KETTERING.
ENGINE STARTING, LIGHTING, AND IGNITION SYSTEM.
APPLICATION FILED APR. 17, 1911.

1,171,055.

Patented Feb. 8, 1916.
9 SHEETS—SHEET 1.

WITNESSES:
Robert S. D'Haem
Ward E. Cromer

INVENTOR.
Charles F. Kettering
BY
Kerr, Page, Cooper & Hayward
ATTORNEYS.

C. F. KETTERING.
ENGINE STARTING, LIGHTING, AND IGNITION SYSTEM.
APPLICATION FILED APR. 17, 1911.

1,171,055.

Patented Feb. 8, 1916.
9 SHEETS—SHEET 3.

WITNESSES:
Robert S. D'Harris
Ward E. Cromer

INVENTOR.
Charles F. Kettering
BY
Kerr, Page, Cooper & Hayward
ATTORNEYS

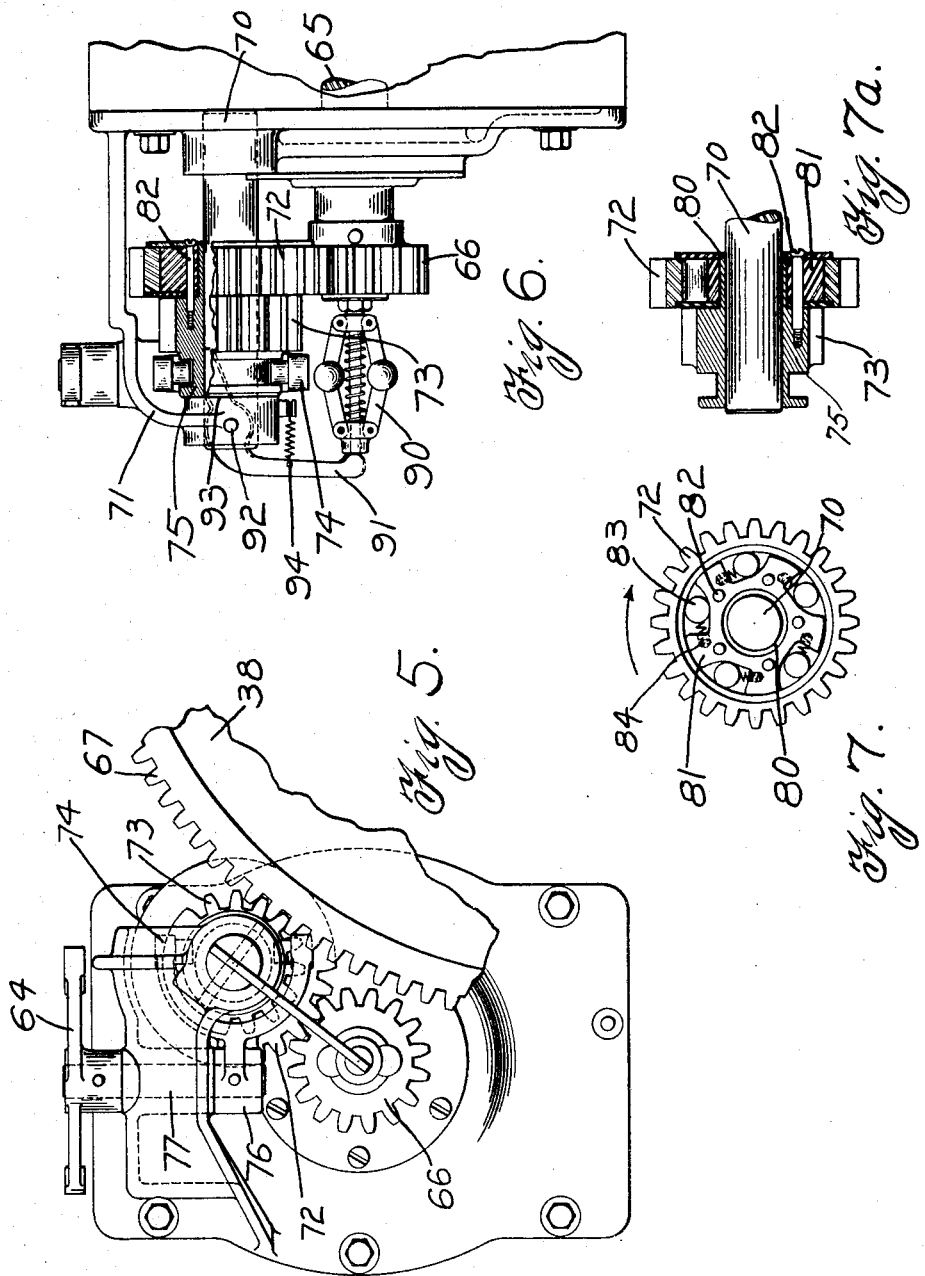

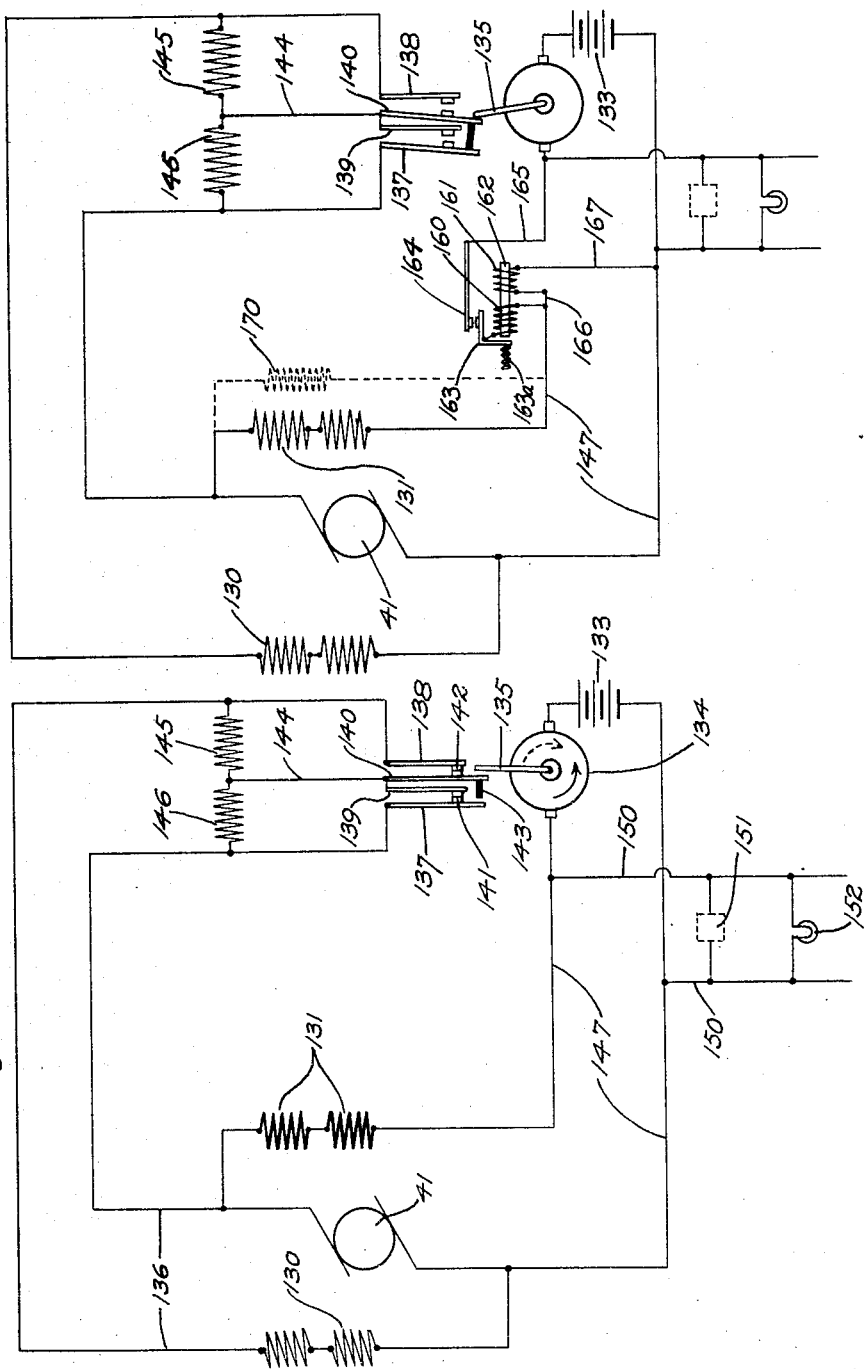

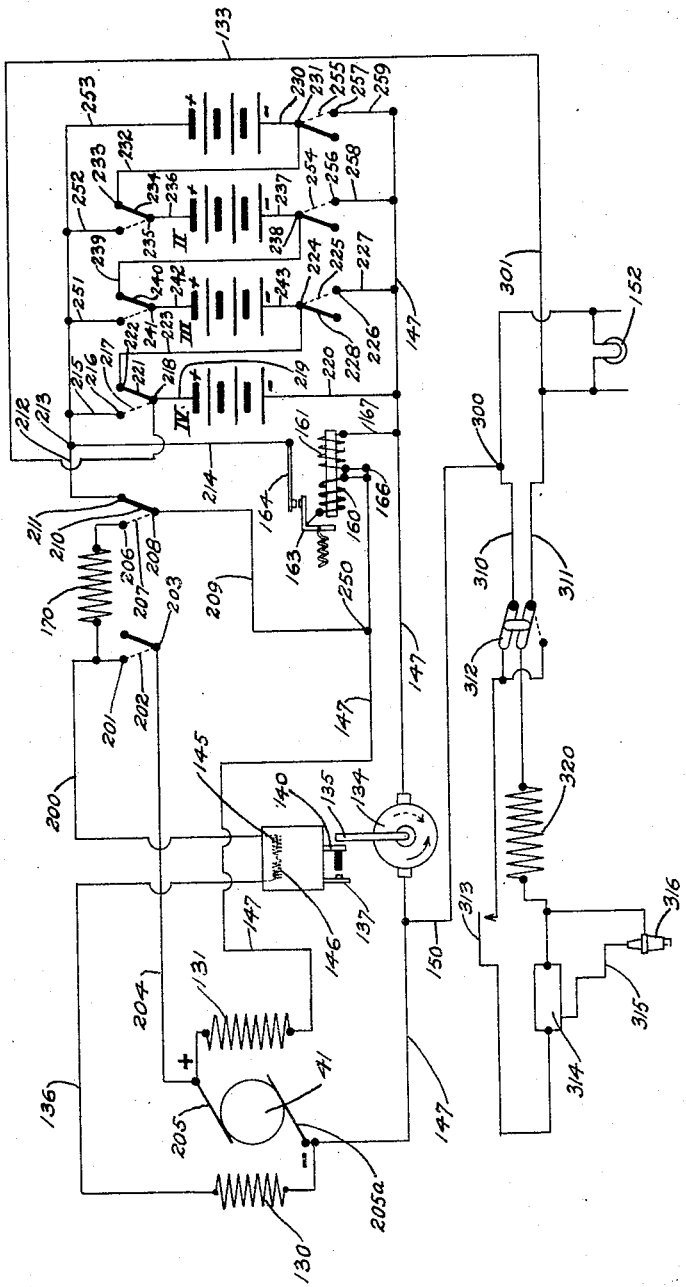

C. F. KETTERING.
ENGINE STARTING, LIGHTING, AND IGNITION SYSTEM.
APPLICATION FILED APR. 17, 1911.
1,171,055.
Patented Feb. 8, 1916.
9 SHEETS—SHEET 7.
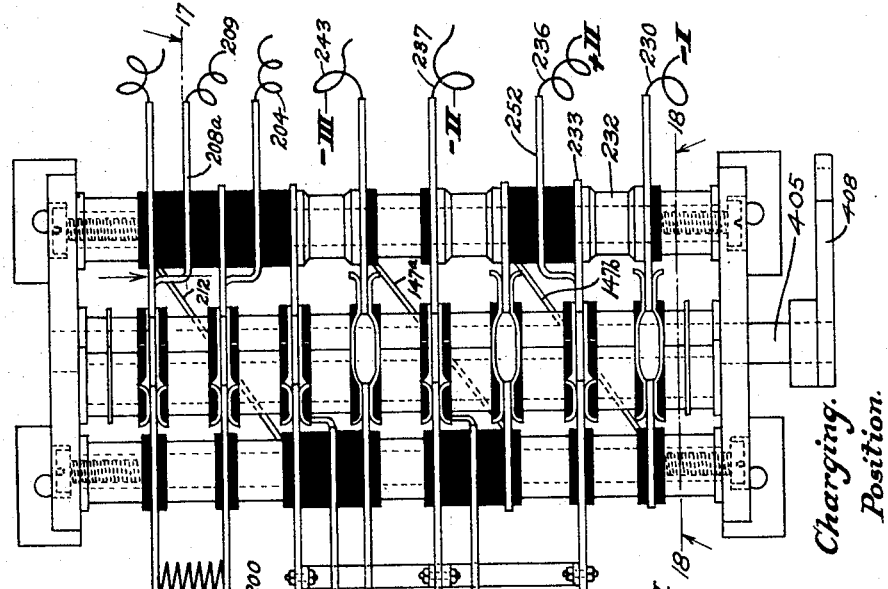

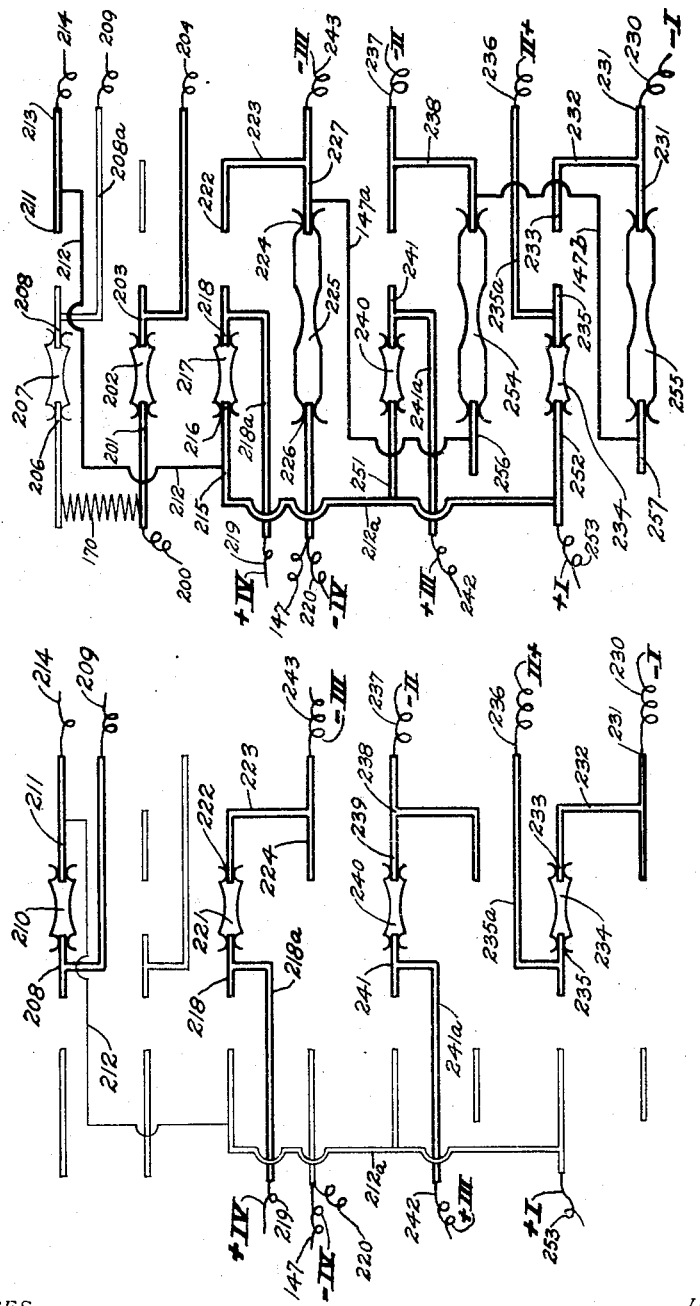

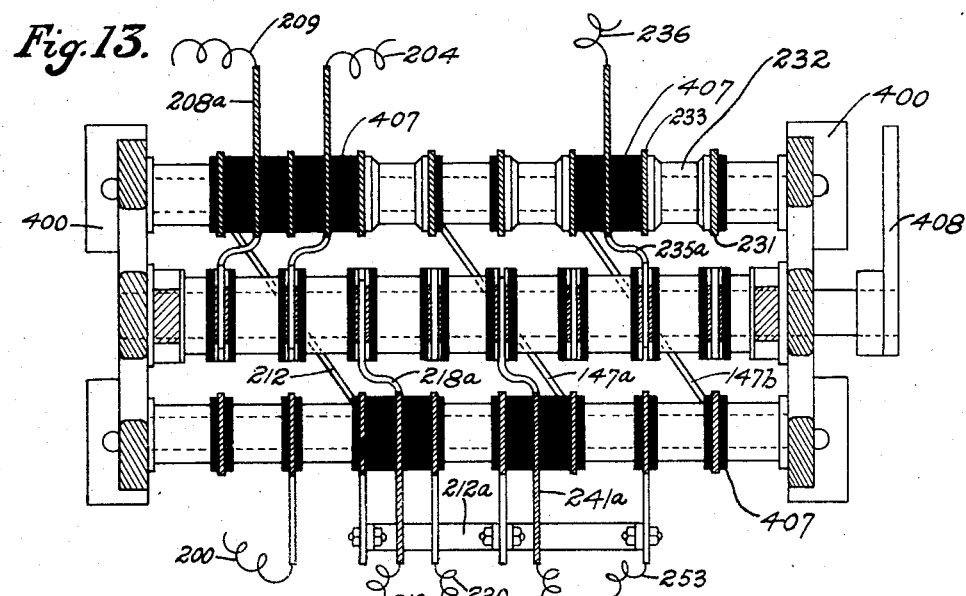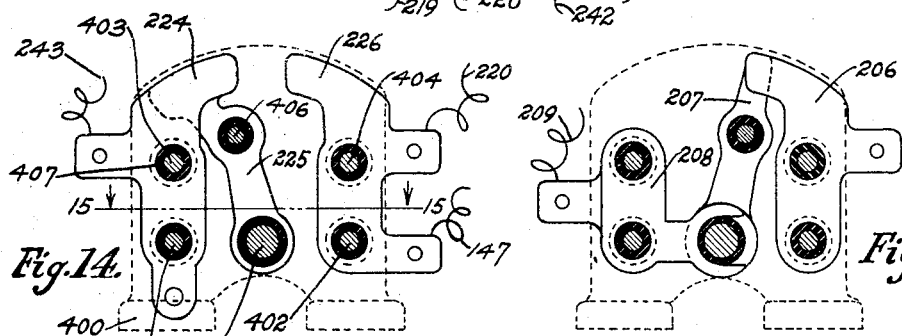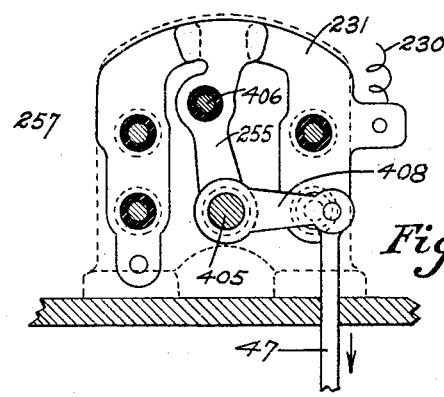

UNITED STATES PATENT OFFICE.

CHARLES F. KETTERING, OF DAYTON, OHIO, ASSIGNOR TO THE DAYTON ENGINEERING LABORATORIES CO., A CORPORATION OF OHIO.

ENGINE STARTING, LIGHTING, AND IGNITION SYSTEM.

1,171,055.     Specification of Letters Patent.     Patented Feb. 8, 1916.

Application filed April 17, 1911. Serial No. 621,512.

*To all whom it may concern:*

Be it known that I, CHARLES F. KETTERING, residing at Dayton, Montgomery county, Ohio, have invented certain new and useful Improvements in Engine Starting, Lighting, and Ignition Systems, of which the following is a full, clear, and exact description.

This invention relates to a system of devices adapted for supplying power to start an engine, and the engine when thus started is arranged to store up power for similar starting operations; and this same power source may then be used for the ignition system of the engine, and to furnish a lighting circuit. That is, in the particular form hereinafter described as embodying my inventions, I have provided an automatic starting device for automobile engines, so as to eliminate the manual cranking of the engine. The power to start, or crank, the engine in this automatic manner is derived from electric storage batteries, which supply current to an electric motor that is connected to the engine. Then after the engine has been thus started, it operates the electric motor as a generator to supply electric current, which is stored up in the storage batteries. It is this current from the storage batteries that may be used for the ignition system of the gas engine, and also for furnishing a lighting circuit, or other electric circuit for various purposes in connection with the use of automobiles. While these improvements are primarily shown and adapted to be employed in connection with automobiles or motor vehicles, they may be readily combined with any type of power driven apparatus or machines, wherein it is necessary to apply an initial starting power thereto in order to bring the normal actuating or driving power of the apparatus or machine into action.

It is among the general objects of these inventions to produce novel combinations of the mechanisms above referred to and to simplify and make their operation more efficient for the various purposes and requirements desired in such apparatus. Among these objects, may be set forth more specifically the following:—first, to secure a high turning power or torque to be applied to the crank shaft of the engine so as to start the same, this power being derived from the storage batteries and applied to the engine by means of the electric motor; and at the same time to make the system adaptable for lighting systems requiring smaller voltage, and also to permit charging of the storage batteries at relatively low voltage. In carrying out these objects the arrangement of the batteries is such that for the starting power, the batteries are arranged in series, for example twelve batteries in series to give twenty-four volts, while for charging these batteries when the motor is run by the engine as generator, the batteries are combined in parallel under a six-volt arrangement. Likewise the motor-generator has both the series and the shunt forms of field windings. The series field winding is alone used for starting, while both the shunt and the series field windings are made use of during the charging operation in what is known as a differential arrangement, *i. e.* opposing each other. The selection of these fields is automatically controlled, according to whether the apparatus is arranged for starting or for charging. With the above described arrangement of the batteries, the charging takes place at comparatively low voltage, for example, six volts as stated; so that the generator begins to charge at a low speed and it is not necessary to speed up the engine or to gear it up to such high revolution as might be necessary if the generator had to charge the batteries at a high voltage. At the same time the lighting system can be taken from a six-volt unit or set of cells which will be sufficient for the ordinary purposes of a lighting system in an apparatus of this sort where the lighting is used in connection with automobiles. Incidental to the accomplishment of the above objects is the desirability of controlling these different devices in a simple and convenient manner requiring as little attention as possible on the part of the operator. For this purpose I have arranged a lever or pedal which controls the various parts as to their starting or their charging conditions. For example, this foot pedal when pressed in one direction operates a controller or switch having electrical connections such that when the pedal is in this forward position, the batteries are in series (giving 24 volts), and the series field winding of the motor is alone connected in the circuit of the batteries so that this motor-generator now acts as a motor to crank the engine. Now when the foot pedal is returned to normal position, this throws the controller to its opposite position, thereby shifting the battery connections to the parallel arrangement and likewise shifting the field windings so as to have the differential arrangement such that the device now operates as a generator to charge the storage batteries. The motor-generator is not permanently connected to the engine. Two different sets of gears are made use of, one set of multiplied gearing being used to connect the motor to the engine for starting, while a different set of gearing is used to connect the engine to the generator for charging. By this means, a high speed of the motor when starting, turns the engine at a low speed, whereas when the engine has been once started and is revolving at fairly high speed, the other set of gearing transmits this same speed to the generator for charging purposes. I make use of this same foot pedal for controlling this gearing in that when the foot pedal is pushed forward for its starting position, the first set of gearing is thrown into mesh to connect the motor to the engine. This gearing remains thus enmeshed until the foot pedal is brought back to its normal rearward position, when the first set of gearing is disconnected or unclutched, and the second set of gearing is connected thereby connecting the engine to the generator for charging.

Incidental to the above objects, I have made a particularly advantageous switch or controller which has two different positions for the purposes above indicated and also for the purpose of controlling other electrical connections as will hereinafter appear, which form advantageous accompaniments to the purposes above explained.

The above enumerated objects are some of the more important ones which these improvements are designed to accomplish. Other objects will appear incidentally as the description of these improvements progresses, and it will also be apparent to those skilled in the art, that the devices possess numerous advantages, some of which will be set forth as the description progresses, but others of which are omitted for the sake of brevity and with the understanding that they will readily be appreciated upon consideration of the combinations and arrangements which are utilized and are set forth in the ensuing description constituting a preferred form of the apparatus. It is to be understood that this is merely a preferred form which is shown and described and that various other forms may be adopted without departing from the spirit and scope of the invention.

The particular form of apparatus in which I have embodied my improvements will now be set forth in detail, having reference to the accompanying drawings forming part of this specification.

Figure 2:
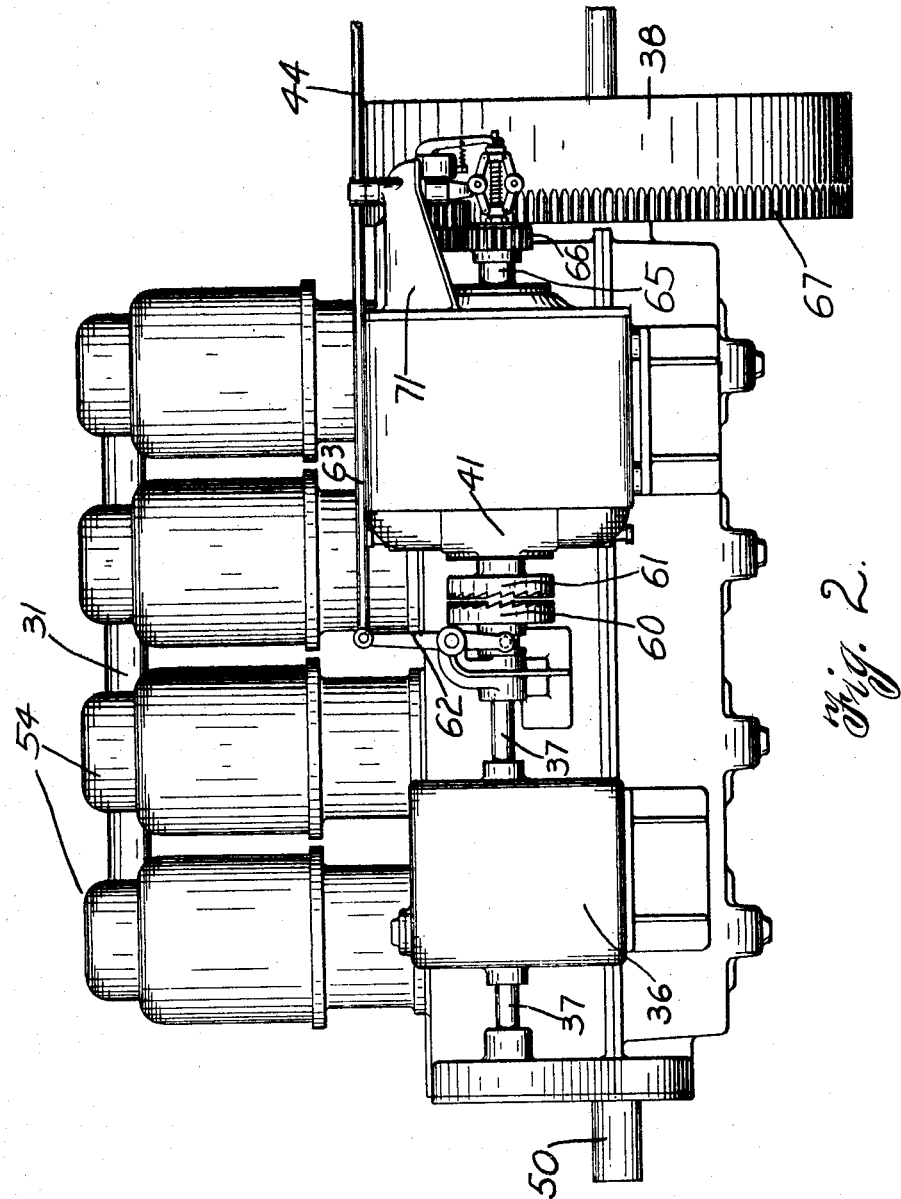
Figure 3:
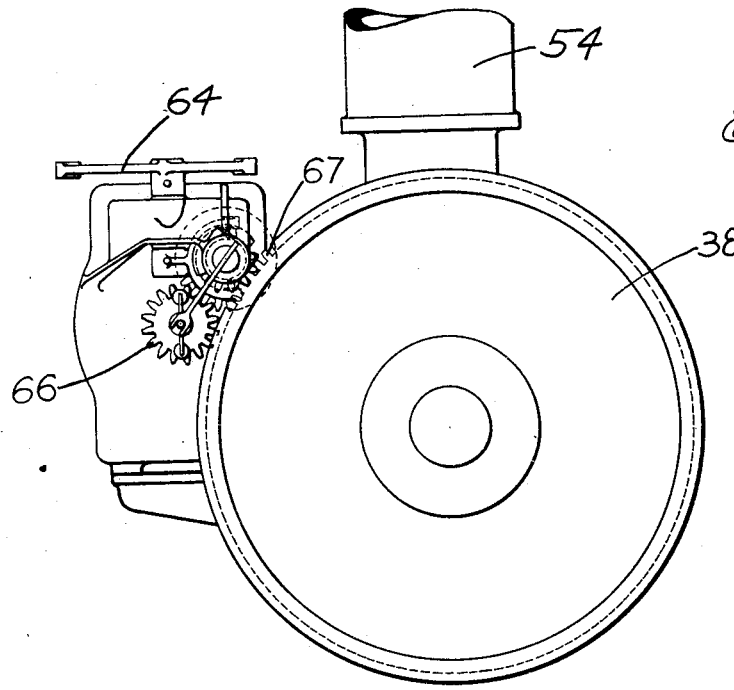
Figure 4:
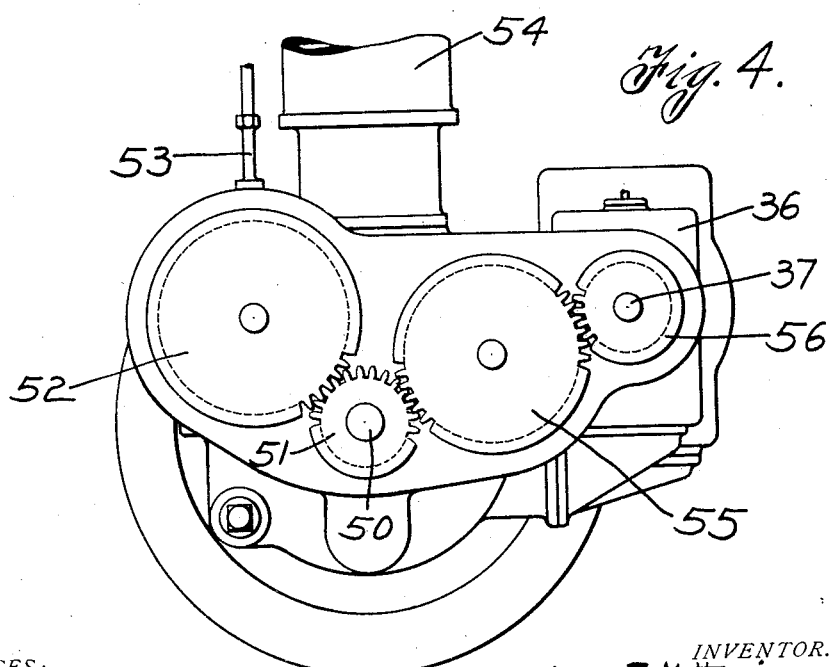

In said drawings, Figure 1 is a top plan view of the chassis of an automobile to which my improvements are applied. Certain parts of the chassis and of the automobile are removed for the sake of clearness, and the portion of my improvements which are shown therein being more particularly the motor-generator and its connections to the engine. Fig. 2 represents a side elevation of the engine and fly wheel of this automobile, showing the motor-generator with the gearing connections and the fly-wheel ready for starting. Figs. 3 and 4 disclose rear and front elevations respectively of the structure shown in Fig. 2. Fig. 5 is a fragmentary detail view of the motor-flywheel gearing, enlarged from Fig. 3. Fig. 6 is a detail side view of the parts shown in Fig. 5, with the exception that the fly-wheel is here removed for the sake of clearness. Fig. 7 is a detail view of the friction clutch carried by one of the transmission pinions of the motor-flywheel gearing, and Fig. 7ª is a sectionalized view of Fig. 7. Figs. 8, 9, and 10 are diagrammatic views of the electrical circuits and connections, Fig. 10 being the complete arrangement of the circuits and devices, while Figs. 8 and 9 are fragmentary for the purpose of clearness and description. Figs. 11 and 12 are top views of the controller or switch which is operated by the foot pedal to control the various electrical connections as referred to generally above and explained more specifically below. Fig. 11 shows the parts as positioned for charging the batteries and Fig. 12 for starting the engine. Figs. 11ª and 12ª are diagrammatic views respectively of the electrical connections for Figs. 11 and 12 of the controller, that is, for the charging and the starting positions respectively. Fig. 13 is a horizontal sectional view of this controller on the line 15—15 of Fig. 14. Figs. 14, 15, and 16 are vertical sections of portions of the controller at intermediate points as shown by the respective section lines and arrows on Figs. 11 and 12.

Referring now to Fig. 1, it may be stated that the type of automobiles in which these improvements are shown as applied, is the "Cadillac", which is a well known automobile on the market at the present time. In this view, the chassis is shown having the side frames 30 and carrying the engine 31 which is of the four-cylinder type ordinarily used in automobiles. 32 are the front wheels, and 33 the running boards. 34 is the box containing the transmission gears, and 35 is the transmission lever which when moved back and forth controls the selection of the transmission gears in a well known manner, one position being the neutral, in which the engine driving shaft is not connected up to the driving wheels of the automobile; and the other positions of the control lever 35 operating the transmission gears to produce the various speeds forward or the reverse speed. 36 is a casing containing the ordinary oil pump such as is customarily used on a car of this type. This oil pump is operated by a shaft 37 which is utilized in connection with the present inventions as will appear hereinafter. 38 is the fly-wheel of the engine, connected of course directly with the engine shaft. 39 is a clutch disk, of the usual form, having the conical-shaped periphery which engages in the interior of the fly-wheel and may be operated as by a pedal 40 to be thrown into and out of engagement with the fly-wheel in a well known manner to make or unmake the connection between the engine and the transmission gears. 41 is a motor-generator forming part of the present improvements and arranged to serve as a motor to start the engine and as a generator to charge the storage batteries. This motor-generator is controlled as to its status as motor or generator, by the foot pedal 42, mounted upon a cross rock-shaft 43. From this rock-shaft 43 there extends upward an arm connected to a link 44 which extends forward to control the gearing connections between the motor-generator and the engine. Another link 45 extends rearward and is connected to a bell crank lever 46 which in turn is connected by a link 47 to the switch or controller 48 shown diagrammatically in dotted lines in Fig. 1. This controller 48 is contained within a casing or box 49 which is carried upon the running board of the car and is intended to be a convenient place to carry also the storage batteries and other appurtenances of this electrical system. These various connections will be described more in detail later, but in general it may be seen from Fig. 1 that the operation of the foot pedal or starting pedal 42 operates through the link 44 to control the connections between the engine and the motor-generator, and through the link 45 to operate the electrical switch or controller which governs all of the electrical circuits as will hereinafter appear. The connections between the engine and the motor-generator will now be described.

Referring to Fig. 4, the engine shaft 50 carries a small gear 51. This meshes on one side with a gear wheel 52 which in a well known manner is used to operate cams which move the valve stems 53 for the respective cylinders 54 of the engine, but as these parts form no portion of the present improvements no further description of them will be given. The gear 51 also meshes with an intermediate gear 55 which transmits motion to its intermeshing small gear 56 said small gear being fast upon the aforesaid shaft 37 which heretofore has been utilized to operate the pump 36 and also has customarily been utilized to operate a magneto for ignition purposes. Because of a previous existence of a shaft of this sort in a car of this type, it is found advantageous to use this as one connecting means for one set of gearing between the engine and the motor-generator. Referring now to Fig. 2, it will be seen that the said shaft 37 carries a shiftable clutch member 60 having teeth adapted to engage with the corresponding clutch member 61 which is fast upon the shaft of the armature of the motor-generator 41. This shifting clutch member 60 is operated by a central pivot lever 62 which is connected to an arm 63 extending forward to an arm 64 (see also Fig. 1). This arm 64 is pivoted at its middle point, the outer end of the arm being connected to the aforesaid link 44 shown in Fig. 1, and the inner end of the arm being connected to the rod 63. Thus it will be apparent that the operation of the foot pedal 42, when pressed forward, throws the link or rod 44 forward, which retracts the rod 63 rearward and thereby moves the clutch member 61 out of engaging position so that it rests in the position shown in Fig. 2. This is the starting position. That is, it is intended that the pressing forward of the foot pedal or starter pedal 42, shall prepare for the starting of the engine by the electric motor; and upon the return of the pedal to normal rearward position, the connections are such as to have the motor-generator operate as a generator. In such case, the return of the foot pedal 42 to normal rearward position would throw the rod 63 forward thus engaging the clutch member 60 with its companion member 61. This makes a direct connection between the engine shaft 50, (Fig. 4), through the countershaft 37 and clutch members 60—61, directly with the armature of the motor-generator. It will be seen that the size of these connecting gears is such that the armature of the motor-generator would in this charging position be driven at the same speed as the engine shaft 50. That is, the generator is driven, for charging purposes, at engine speed.

I will now describe the connections between the engine and the motor-generator for the starting position, that is when the motor-generator is operating as a motor.

As seen in Fig. 2, the end of the armature shaft 65, of the motor-generator, carries a pinion 66. The fly-wheel 38 is formed upon the forward parts of its periphery with gear teeth 67. There is a shifting gear arrangement so arranged that these gears will connect up the motor pinion 66 to the gear teeth 67 of the fly-wheel, or said gears may be shifted laterally so as to break this gearing connection. The exact construction of these parts is shown more clearly in Figs. 5 and 6. A stub-shaft 70 projects from the framework of the motor-generator, being at its outer end suitably supported by a framework 71. Mounted to slide or shift laterally upon this stub-shaft are two gear wheels 72 and 73 which are arranged to be clutched together in a manner to be presently explained. The gear wheel 72, which is the larger of these two, is arranged to mesh with the motor pinion 66; while the smaller gear wheel 73 is arranged to mesh with the teeth 67 of the fly-wheel 38. The device for shifting these gear wheels 72 and 73 forwardly and rearwardly on the shaft 70 comprises a yoke 74 which projects into an annular groove formed in the sleeve 75 extending from these gear wheels. This yoke is fast to a hub 76 said hub being pinned to a shaft 77. The shaft 77 extends forward from a similar hub which is the center part of the aforesaid arm 64 said arm being operated by the starter pedal 42. Thus when the starter pedal is pushed forward so as to throw the connecting rod 44 forward, this rocks the arm 64 and thereby turns the aforesaid short shaft 77 so as to move the yoke 74 rearward (to the left in Fig. 6). This shifts the intermediate gears 72 and 73 to the left in Fig. 6 and brings the gear 72 into mesh with the motor gear 66 as seen in the position shown in Fig. 6. In this position the gear wheel 73 is meshing with the teeth 67 of the fly-wheel 38. In Fig. 6 the fly-wheel is shown removed for the sake of clearness, but the position can readily be seen from Fig. 5. Now when the starter pedal 42 is allowed to return to its normal position, this shifts the gear wheel 72 and 73 to the right in Fig. 6 and withdraws the gear 72 from meshing with the motor pinion 66 and also withdraws the gear 73 from engagement with the teeth of the fly-wheel. Now when the parts are in the position shown in Fig. 6, which is the starting position, the ratio of the gearing is a multiplied ratio, that is, the motor pinion 66 can revolve at a fairly high speed, but the fly-wheel of the engine moves comparatively slowly so that thereby the motor may revolve rapidly and the engine may be cranked slowly by the motor for the purpose of starting. As seen above, when the starter pedal 42 returns to normal rearward position, the gearing connection between the motor pinion 66 and the fly-wheel is broken by the shifting of the gears 72 and 73, and the other connecting gearing between the engine and motor generator is brought into play, that is, the one to one ratio gearing, through the medium of the clutch members 60 and 61 which drive the motor-generator from the engine as a generator. Usually it will be possible to make the gear wheels 72 and 73 go into mesh respectively with the pinion 66 and gear teeth 67, but if these gears happen to be out of proper alinement for enmeshment upon this shifting, the initial movement of the motor pinion 66, by reason of the starting up of the motor current upon the shifting of the starter pedal (as later explained), would give the motor pinion enough movement to start to pick up these gears and permit the lateral shifting. Or if desired, some auxiliary device could be utilized to give the motor a slow turning movement preliminary to the shifting of these gears for enmeshment. Such a device forms the subject matter of another pending application filed by me June 15, 1911, Serial Number 633,443.

It has just been stated above that the two gears 72 and 73 were arranged to be clutched together in order to turn the fly-wheel by revolution of the motor shaft pinion 66. This clutch mechanism is shown in Figs. 7 and 7ª, and is of a well known form. Loosely mounted upon the aforesaid stub-shaft 70 is the said gear wheel 73 which has a laterally extending collar 80 over which is fitted a tooth shaped cam disk 81, the shape of which is clearly shown in Fig. 7. This disk 81 is pinned to the gear 73 by pins 82. In the recesses between the disk 81 and the inner periphery of the gear wheel 72 are friction rollers 83 which are normally spring-pressed away from the disk 81 by springs 84. When the gear wheel 72 rotates in the direction of the arrow in Fig. 7, which is the direction of rotation under which it is driven when the motor revolves for starting, the friction of the inner periphery of the gear wheel 72 carries the rollers 83 into the V-shaped portions of the recess between the disk 81 and the gear 72. This causes the gear 72 to drive the disk 81 and thereby drive the pinion gear wheel 73. This in turn drives the fly-wheel as is obvious from Fig. 5. If the motor is thus brought to drive the fly-wheel and start the engine, then as soon as the engine starts, it will naturally tend to revolve faster than the motor would tend to drive it. In this case the gear 73 is now driven by the engine, thus driving the disk 81 and resulting in the friction rollers 83 occupying the enlarged portions of these slots in which they reside. This prevents any friction grip upon the gear wheel 72 so that the disk 81 and gear wheel 73 and the fly-wheel of the engine, can all revolve faster than the gear 72 while the gear 72 is driven slowly by the motor so long as the motor is running under its own current. This permits the engine to run ahead of the motor as soon as it has started. I have also arranged a preventing means which prevents the reën- gagement of the gear wheel 73 with the fly wheel after the engine has been started and the gears have been disengaged. By referring to Fig. 6 it will be seen that the end of the motor shaft 65 carries a centrifugal governor 90 against the end of the movable portion of which rests a blocking lever 91 pivoted at 92 to a portion of the framework. The upper end 93 of this blocking lever rests in a slot in the end of the shaft 70 and is of such length that when the yoke 74 is moved to shift the gear wheels 73 and 72 to the right in Fig. 6, the inner end of this portion 93 of the blocking lever, tends to spring up (under tension of spring 94) into dotted line position so that the end of the lever will abut against the outer end of the sleeve carrying the gear 73 and thus block the movement of the gear wheel 73 to the left. This movement of the blocking lever is permitted when the motor has got up to speed so that the governor balls separate and permit the arm 91 of this lever to spring inward. Thereupon as soon as the operator restores the starting pedal to normal position, thereby shifting the gears 72 and 73 out of mesh with the fly-wheel, this blocking lever then prevents the gears from being shifted back again. Thus the result is that after the motor has started the engine, and the engine fly-wheel has got up to speed, then if the operator returns the starter pedal to normal position and disengages the gear 73 from the fly-wheel, these parts cannot again be engaged until the motor has stopped or slowed down to slow speed. This prevents injury to the gears by trying to force them into mesh when running at too high a speed. This mechanism forms the subject matter of my co-pending application, Serial No. 22,310, filed April 19, 1915.

I will now describe the electrical connections and arrangements the purposes of which have been referred to above and which operate in conjunction with the use of the aforesaid starter pedal.

As has already been explained with reference to Fig. 1 the pedal 42 is connected to and operates the sliding rod or link 47 which operates the switch or controller 48 shown diagrammatically in Fig. 1. It is this controller which governs the operation of the electrical devices and controls the various circuits thereof for the purposes outlined. This controller is shown in Figs. 11 to 16 inclusive, and in Fig. 16 is shown the same connecting rod 47 which operates the controller in a manner later to be explained. A spring 104 (shown in Fig. 1) operates upon the pedal 42 to normally tend to bring the pedal back to rearward position, thus automatically returning the switch connections to normal position and automatically disconnecting the mechanical gearing connections between the engine and the electric motor. Before describing this controller in its mechanical detail however, the electrical circuits and arrangements will first be described in connection with diagrammatic views for the sake of simplicity in understanding the construction and operation of the controller which in itself is somewhat complex in structure.

Figs. 8 and 9 represent diagrammatic views of certain parts of the apparatus, while Fig. 10 represents the complete circuit arrangements, the diagrams being separated in this manner for the sake of simplicity and description. Referring to Fig. 8, the motor-generator 41 is shown having its field wound differentially with shunt and series windings. That is, there are the shunt field coils 130 and the series field coils 131, said coils being wound differentially, that is, wound oppositely so as to oppose each other in magnetic effect when used together for exciting the field. The storage battery is shown at 133, representing the battery or set of cells which are utilized to supply current to drive the motor-generator as a motor and in return to be charged by the latter when running as a generator. As will be described presently, when arranged for starting, the series winding 131 is alone used, whereas for the charging position of the controller, the differential windings, namely shunt field 130 and series field 131, are used. But in this charging arrangement, it is desirable to have some device for controlling the extent of charging of the batteries so as not to overcharge them beyond the point of saturation. This is accomplished by means of an electric meter placed in series in the charging circuit and controlling certain resistance in the shunt-field of the generator. This subject matter is described and claimed in my co-pending application, Serial No. 628,813, filed May 22, 1911. This electric meter 134 (Fig. 8), is operated by the flow of the current through it, to revolve the contact pointer 135. This contact pointer controls the resistance device just referred to, in the following manner: The lead wires 136 extend from the generator and from the shunt windings 130 to contact strips 137 and 138. Located between these two strips are two other strips 139 and 140. Normally the contact strips 137 and 139 make contact at their outer extremities through the contact points 141, and similarly the contact strips 138 and 140 normally make contact through the contact points 142. At the outer end of the contact strip 140 is a pin 143 arranged to strike the contact strip 141 when the strip 140 is moved to the left in Fig. 8, thus separating or breaking the connection between strips 137 and 139. Contact strips 139 and 140 are connected together at their inner ends as shown, and a wire 144 extends therefrom to an intermediate point between two resistance coils 145 and 146 which are bridged across between the lead wires 136, as shown.

The operation of this device is as follows: When the batteries are being charged, the pointer 135 moves in the direction of the full line arrow in Fig. 8. At the point of saturation of the batteries, the parts are so arranged that the pointer will at that time come in contact with the strip 140. The first effect thereof is to separate the contact strips 138 and 140. Before such separation, the shunt-field circuit was made through the wires 136, contact strips 137, 139, 140 and 138, thereby short-circuiting the resistance coils 145 and 146. But the separation of the contact strips 140 and 138 makes it necessary for the current to flow through the strips 137 and 139, through the wire 144, and then through the resistance coil 145,—that is the current in the shunt-field. The result is that this resistance thereby introduced into the shunt-field weakens the current in the shunt-field, and on account of the arrangement of the field windings, this weakens the current flowing through the main lead wires 147 and thus weakens the current delivered to the storage batteries 133. Now the further movement of the pointer 135 in the same direction carries the strip 140 still farther to the left so that the pin 143 strikes the strip 137 and breaks the contact between said strip and the strip 139. This obviously throws the other resistance coil 146 into the shunt-field circuit, thereby introducing still greater resistance therein. (See Fig. 9 for position of parts at this stage.) This still further reduces the strength of said shunt-field and likewise reduces the strength of the main current delivered to the storage batteries. By making these resistance coils of sufficient resistance, the charging current may in this way be reduced to a negligible quantity at the point when the batteries are saturated. From the main lines 147 extend lead wires 150 which are used for tapping off of this storage battery circuit, the necessary current for the ignition apparatus shown diagrammatically at 151 and the lighting devices shown diagrammatically at 152. Thus assuming that the batteries have been charged to point of saturation and the charging current reduced to minimum in the manner described, then if the ignition and lighting systems are put into operation, tapped off of this storage battery circuit, the use of the substantial amount of current from said circuit for the purposes mentioned, will cause the electric meter to travel in the reverse direction as indicated by the dotted arrow in Fig. 8. This retracts the pointer 135 from contact with strip 140 so as to restore the parts into position shown in Fig. 8 in which resistance coils 145 and 146 are short-circuited so that the shunt field may have its maximum effect. Then the charging may go on as previously explained. The strips 137 and 140 may be of spring material so that they normally assume the straight position shown in Fig. 8. Now the reducing of the charging current to a minimum, when the batteries have reached point of saturation, may be sufficient, but it may be also desired to break this charging current altogether at such point; and for that reason I have introduced an automatic cut-out as shown in Fig. 9. This cut-out comprises two coils 160 and 161 the former being a low-resistance coil and the latter a high-resistance coil, wound upon a core 162. A right-angle armature 163 is connected to the coil 160 and when attractive by the core 162, makes contact with the overlying strip 164 which is connected by a wire 165 with the main line of the electric meter and storage batteries. Both coils 160 and 161 are connected at the point 166 with the upper wire 147, and the other end of the coil 161 is connected by wire 167 with the lower wire 147. In the position of the parts of this cut-out shown in Fig. 9, the storage batteries are normally disconnected from the circuit coming from the generator, since the armature 163 and contact strip 164 are separated. Thus when the generator starts to turn for beginning the operation of charging, the current through the series field and wires 147, first has to build up through the high-resistance coil 161 so as to attract the armature 163 to the core 162 and thus close the circuit through the strip 164 and thereby put the storage batteries into the main charging circuit. This movement of the armature 163 enables the main current to pass through the low resistance coil 160 to the storage batteries, thereby maintaining the contact closed against the strip 164. It will now be seen that the cut-out operates to prevent the current from the storage battery discharging back through the generator in case the generator should slow up so as to reduce its current by slackening of speed. That is, the kick-back of the current from the storage battery, running through coil 160 reversely would break the circuit connection between the armature 163 and strip 164. The spring 163ª restores armature 163 to the position of Fig. 9. This cuts the storage battery out of the generator circuit and leaves the generator circuit running through the high resistance coil 161, wherein the current is now too weak, on account of the slow speed of the generator, to energize the core sufficiently to restore the contact with the strip 164. This is a well known operation of electrical cut-outs, but I have made use of the cut-out in this position not only to operate as a cut-out in the manner just explained, but also to cut off the storage battery circuit connection completely when the point of saturation of the batteries is reached. That is, when the electric meter pointer 135, has moved to the position of saturation of the batteries, as shown in Fig. 9, thereby throwing the resistance coils 146 and 145 into the shunt-field circuit as already explained, this weakens the shunt-field and minimizes the charging current coming from the generator to such an extent that it is similar in effect to the slowing up of the generator in speed. That is, the batteries kick-back or overcome the charging current and thereby operate the cut-out to cut the batteries out of circuit altogether. Thus it will be seen that the operation of the electric meter is first to weaken the charging current at the point of saturation of the batteries, and then break this charging circuit altogether by means of this cut-out, which is the same cut-out which operates in this manner to effect the breaking of this charging circuit when the charging current becomes weakened for any other reason such as slowing up or stopping of the generator. It will be seen from this particular arrangement of the differential windings of the generator, that when the generator first starts to operate, the field is built up in the shunt windings and the current gradually begins to rise in the main line and also in the series winding. The series winding being opposed in effect to the shunt winding, this rise of the current therefore has the effect of gradually bringing the two fields into a point of balance so far as concerns their combined effect on the field. Therefore the charging current rises rapidly at first and then reaches a point where the increase in speed of the generator produces but very little increase in the charging current. This is particularly advantageous in an apparatus of this sort designed for charging purposes where the generator may have variable speeds within wide limits and sometimes rather excessively high speeds. In such event the current soon rises to its maximum and then rises beyond that only very slowly. The relationship between the shunt and the series windings respectively is of course suitably arranged as to the number of turns to effect the reaching of the maximum current at the desired point. It may be desired however to reach this maximum charging current more quickly, that is, to reach it for lower speed of the generator so that the generator will be charging the batteries over a longer period of time in the ordinary varied operation of the device. To accomplish this I provided an iron wire by-pass or short-circuit resistance 170 shown in dotted lines in Fig. 9. This resistance may be of any suitable nature which is variable with the condition of the current flowing therethrough. Iron wire has the property of increasing its resistance when heated up under the influence of increasing current flowing through it. Thus it will be seen that with this arrangement, the iron wire when cold at the outset, forms a short circuit around the series field. Therefore the opposing effect of this field is $nil$ in the early speeding up of the generator. Therefore the current, under the excitation of the shunt-field, rises very rapidly to a maximum and sends the charging current through the iron wire resistance 170. The rising of the current therein however heats up the wire which in turn increases the resistance and thus begins to send the current through the series winding 131 which then causes the opposing effect in the field to take place as previously explained. This produces this balancing effect so that the current then stands at its substantial maximum without any material increase with the increase of speed of the generator.

I will now describe in diagrammatic form the connections for rearranging the batteries for starting and for charging such that they are in series for starting the motor, and in multiple for being charged by the generator; also whereby the motor is used with its series winding alone for starting as a motor but with the shunt-series arrangement for generating. In this connection it may be stated that as the accompaniment to this shifting arrangement, the same switch controller which accomplishes this, also eliminates the cut-out device for the starting operation. These arrangements are shown diagrammatically in Fig. 10. The arrangement of storage batteries is shown at the right in Fig. 10, with the batteries grouped in four sets of three cells each. This would make twelve cells in all which at approximate voltage of two volts each would give approximately 24 volts if the cells are all used in series. As will presently be seen, these cells are used in series to give this 24 volts for starting, that is for driving the motor-generator as a motor to start the engine. Whereas in the charging, the cells are arranged in multiple series having four groups as shown, each group having three sets in series and these groups being arranged in parallel for charging so that the charging takes place practically at six volts. In this arrangement of the connections for accomplishing the shifting of the storage batteries in this manner, the dotted line connections represent the positions of the shifting switch controller when the device is arranged for charging, while the heavy line connections represent the positions for the switch controller in the starting arrangement with the batteries all in series. This will be explained presently in detail. This shifting of the connections for the purpose explained is accomplished by a mechanical controller the construction of which will be hereinafter shown in detail but in this Fig. 10 the shifting is shown diagrammatically and the various parts and terminals involved therein will be numbered so that they can be identified with the mechanical parts used in the controller shown in Fig. 11 and the succeeding figures relating thereto. The electric meter 134 is shown at the left in Fig. 10 with the arrangements for controlling the shunt-field of the motor generator 41 as has already been explained with reference to Figs. 8 and 9. The cut-out device explained in Fig. 9 is shown about in the center of Fig. 10 and its operation will readily be understood in connection with the ensuing description of Fig. 10. The iron wire resistance 170 is shown in a different location in Fig. 10 from what it is shown in Fig. 9 but the actual location as a by-pass or short-circuit around the series winding of the motor-generator, for the charging condition, is still the same. One of the lead wires 136 extending from the shunt winding 130 leads to the previously described resistance coils 145 and 146 and extending from the other side of these coils is a lead wire 200 which connects with a contact point 201. This contact point 201 is shown connected by a dotted line or electrical connection 202, with a contact point 203. From this point 203 a lead wire 204 extends back to the brush 205 on the motor-generator. The iron wire resistance 170 is located between the contact point 201 and another contact point 206. A dotted line or electrical connection 207 is shown connecting the point 206 with the contact point 208. From this point a lead wire 209 extends to connect up with the lead wire 147 which goes back to the series winding 131 of the motor-generator. The said contact point 208 is shown connected by heavy line or connecting strap 210 with a contact point 211. It will be understood that in this case as in the succeeding ones, the dotted line 207 represents the position of a certain electrical connector when the parts are arranged for charging, whereas the heavy line 210 represents the shifted position of this electrical connector for the condition of starting. Thus the lines 207 and 210 represent really the same element which shifts to connect the point 208 either with the point 211 or the point 206. The same system is diagrammatically used for the other shifting connections as will presently appear. A lead wire 212 extends from the point 211 to form a common wire for connecting up to one side of the batteries when arranged in multiple-series for charging purposes. From this wire 212 there extends from the point 213, a lead wire 214 which connects with the previously described contact strip 164 forming part of the cut-out device. The armature 163 of this cut-out device is connected with the aforesaid coil 160 which in turn is connected with the common point 166 to which the other coil 161 is connected as previously explained in connection with Fig. 9. The position and connections of this cut-out device will therefore readily be understood from this and the previous description. Going back to the battery connections, the common wire 212 has extending downward from it, for the fourth set of cells, the set at the left in Fig. 10, a lead wire 215 which connects with a contact point 216. This point 216 is connected by a dotted line or electrical connection 217 with a contact point 218. From this point 218 a connecting wire 219 extends to the left-hand or fourth set of three cells, of the storage battery. The four different sets of cells are designated by roman numerals in Fig. 10, also with their positive and negative terminals for the sake of convenience. From the opposite side of this set of cells No. IV, a lead wire 220 extends downward to the common wire 147 which leads back to the other brush 205ᵃ of the motor-generator (through the electric meter 134). These various connecting wires and contact points are numbered in detail in this manner so that the parts may be identified on the figures relating to the mechanical switch controller subsequently to be described. Leading from the contact point 218 is the heavy line or connecting strap 221 which connects with the contact point 222. As previously stated this heavy line 221 represents the shifted position of the dotted line connection 217 and vice versa. A lead wire 223 extends from the contact point 222 to a contact point 224 on the opposite side of the third set of three cells of the storage battery, set No. III. From this point 224 a dotted line connection 225 is shown connecting with the contact point 226 from which a lead wire 227 extends which connects with the aforesaid common return wire 147. The heavy line 228 is shown connected with this same point 224 to represent the shifted position of the connection 225 when breaking the connection between the points 224 and 226. Without repetition of the details of the connections for the other sets of cells of the storage battery, it is thought that the previous description will make it clear just what the system of connections is, making use of the dotted and heavy lines for the respective shifting positions. As previously stated these various parts are numbered separately in order to identify them more clearly on the figures showing the actual mechanical parts of the switch controller in Figs. 11 et sequitur. Exact tracing out of these connections will now be explained for the two stated conditions of the circuits, first for starting and secondly for charging. It having been stated that the heavy lines of these V-shaped shifting elements repre- sented the positions of these parts for the starting operation, it will be assumed first that the heavy lines in such cases represent the actual connection and that where the corresponding dotted lines are shown, there is no cross-connection. Therefore to trace the complete connections for the starting condition, the circuit may be considered as starting at the lower side of the right-hand set of batteries or cells, that is set No. 1, the circuit extending through the lead wire 230 to the point 231, thence to the connecting wire 232 to the point 233, heavy line or connecting strap 234, point 235, lead wire 236, to the second group or set of cells, No. 11; then lead wire 237, point 238, lead wire 239, connector 240, point 241, lead wire 242, to the third of the group of cells, then lead wire 243, point 224, lead wire 223 to the point 222, then connector 221 to the point 218, lead wire 219 to the left-hand or fourth group of cells; lead wire 220, wire 147, meter 134, brush 205ª of the motor, through the motor to brush 205, thence through the series coil or winding 131, lead wire 147 through point 250 to lead wire 209, point 208, connector strap 210 to point 211; and thence by lead wire 212 back to the other side of the right-hand or first set of cells of the battery. It is obvious that from these connections, the cells are all arranged in series so as to give 24 volts through the motor for starting purposes, thus giving high voltage. It will likewise be seen that the shunt field winding 130 is cut out of operation in this starting condition because of the gap represented by the dotted line 202, also the gap represented by the dotted line 207, which represent different places in the shunt field circuit. This gives high voltage through the motor for starting and a series wound motor to give high torque for the purposes and with the advantages hitherto referred to. It will likewise be seen that because of the high resistance of the coil 161 of the cut-out, this cut-out is not in operation for any purpose during this starting operation. The electric meter is however in the circuit during this starting operation so that any current used on this account will run through the meter and revolve its pointer in the direction of the dotted arrow so as to require the charging of the batteries to replace the current used up for starting purposes, thereby rotating the pointer in the reverse direction as previously explained in connection with Figs. 8 and 9, until the batteries are again saturated. This condition of the switch or controller and the diagrammatic connections for the charging will now be explained.

Starting at the generator this time, the current first rises in the shunt field through the brush 205, lead wire 204, to the point 203, then by the dotted line connection 202 to the point 201, then back by the lead wire 200 through the controlling resistance coils 145 and 146 or the various contact strips 138, 140, 139 and 137, back through the wire 136 to the shunt field coil 130 to the other brush 205ª. Thus the shifting of the connection to the dotted line position 202 brings the shunt field into operation so that the generator now for charging has the differential winding arrangement. The current having energized the shunt field, the current may now be traced in the main charging circuit from the brush 205 through the series coil 131, to the lead wire 147. It will be seen that the iron wire by-pass resistance is now short circuited around this series field coil 131 by reason of the fact that the dotted line connection is made at 207 between the points 206 and 208. This represents the same by-pass or short-circuit by the iron wire 170 as previously referred to in Fig. 9, for the purpose of making the quick rise of the charging current as already explained. Continuing then on the main circuit which may be considered as running either through the iron wire 170 or through the series coil 131 to the common meeting point 250, the main charging current then runs through the high resistance coil 161 of the cut-out device, back through the connecting wire 167 and lead wire 147, to the other brush of the generator. As soon as the current has then risen to the sufficient extent to operate the armature 163, as previously explained, the main current may then flow through the coil 160, armature 163, contact strip 164, lead wire 214, to the common battery wire 212. From thence the current flows through the wire 215, point 216, connecting strip (dotted line) 217, point 218, wire 219, through the fourth set of storage cells, then by the wire 220, back to the common lead wire 147 on the other side of the batteries, and back to the generator. At the same time that these three cells are being charged in this manner, all the other three sets of cells are being charged in parallel with the first set, by reason of the fact that from the common wire 212, there extends the lead wires 251, 252 and 253 to the upper sides of the other groups of three cells each, the lower sides of which groups are connected by the lead wires 224, 237, and 230, to their respective points 234, 238, and 231, and thence through the connecting straps (dotted lines) 225, 254, and 255, to the respective points 226, 256 and 257, and thence by wires 227, 258 and 259 respectively, to the common return wire 147 back to the generator. Thus under these dotted line connections (the heavy line connections being considered eliminated), the generator is now in its condition for charging the batteries in multiple series arrangement of four groups in parallel with three cells in series in each group, and the generator has its field wound with the differential winding arrangement. The iron wire 170 is also included in this charging arrangement but of course if desired it may be dispensed with without affecting the rest of the circuit. It may be noted that as one part of this advantageous arrangement, the series coil which forms one of the field windings for the differential arrangment of the generator for charging, is the same series coil which is alone made use of as a series-wound motor for the starting condition.

I will now describe the electrical connections for taking off the lighting circuit, also the circuit for the ignition. It is of course desirable that this lighting and ignition circuit be so taken from the storage batteries that the electric meter will be included therein so as to measure the current which comes from the storage batteries either for lighting or ignition purposes or both. Therefore after current has been consumed for this purpose, the running of the engine can recharge the batteries to the extent required to make up the loss occasioned by the use of this current. Just to the left of the electric meter shown in Fig. 10, is the lead wire 150 which forms one line for connection with the lighting and ignition circuits. This wire connects at the point 300 with one side of the light circuit for the electric lamp 152. The other side of this lamp circuit comprises a lead wire 301 which extends over to the upper side of the fourth or left-hand group of cells, connecting with the lead wire 219 thereof. The previously described lead wire 220 connects from the other side of this fourth group of cells, to the lead wire 147, and back through the meter 134 to join the aforesaid light line or lead wire 150. Thus it will be seen that the lighting circuit has a constant connection from one of the groups of three cells, so that said single group of three cells supplies six volts through the meter to the lighting circuit at all times, irrespective of any position of the switch controller, that is of the dotted line and heavy line connections above referred to. This arrangement is particularly advantageous because there is no flickering of the lamps with the shifting of the controller from one position to the other for the starting or the charging arrangements. This six volts is sufficient for the ordinary purposes of a lighting system in an apparatus of this sort when used more particularly in connection with the starting of automobiles. Of course as many lights as may conveniently be necessary can be tapped off of this lighting circuit up to the proper limit, said lights being used for head-lights or side or end lamps or for any other purposes in connection with the car. Under this arrangement the batteries are charged by the generator at six volts, the cells being arranged in multiple series for this purpose and this can go on while the lighting circuit is in operation to light the lamps. The batteries are charged equally under this group arrangement, that is there is an equal distributive effect in the batteries upon charging. And by tapping off the lighting circuit from a six-volt set, the generator is furnishing the proper or required six volts for charging or for lighting in case the batteries have been discharged to a point where they are just even with the lighting consumption.

I will now describe the ignition circuit connections. This ignition system is shown at the lower left-hand part of diagrammatic Fig. 10 and is tapped off of the same part of the circuit which provides the lighting current. The wires 310 and 311 lead to a pole-reversing switch 312 which when shifted to the dotted line position changes the direction of current through the ignition device. This is advantageous for the reason that since this is a continuous direct current flowing in one direction from the storage batteries, the reversing of said current occasionally by the turning of this switch will minimize any disadvantage which might result from having the ignition current flow always in one direction through the apparatus. The key 313 represents an ordinary make-and-break device for the purpose of producing a spark in the cylinders of the driving engine of the car. 314 represents in diagrammatic form the ordinary induction coil containing primary and secondary coils. The secondary is connected by wire 315 with the ordinary form of spark plug 316. Thus the making and breaking of the contact at 313 causes sparks in the spark plug 316 for the regular and usual ignition purposes. 320 is an iron wire resistance introduced in this ignition circuit with the primary of the induction coil. The purpose of this resistance is to prevent the batteries from being run down or depleted in case the engine should happen to stop on contact. In such event the key 313 would be closed and would remain closed so that the ignition circuit would be closed and would tend to run down the batteries, but the current running through this iron wire 320 heats the same up to such an extent that its resistance very materially increases and thereby diminishes the current flowing through the ignition device. Of course ordinarily the usual provisions would be present for disconnecting the ignition circuit in the usual manner in case of stopping of the engine so that this device would become important only in the event that such breaking of ignition circuit was omitted and at the same time the engine happen to stop on the contact. In such combination of events the iron wire resistance would come into play to prevent depletion of the batteries as just described. This device just referred to is described and claimed in my co-pending application, Serial No. 643,547, filed August 11, 1911.

Having now described the arrangements for shifting from the starting to the charging conditions I will now describe the mechanical construction of the switch or controller which accomplishes this shifting, that is which accomplishes the shifting of the circuit connections corresponding to the dotted and heavy line connections above referred to in connection with diagrammatic Fig. 10.

The controller has two supporting end frames 400 (see Figs. 11 and 13). These frames are shown in dotted outline in Figs. 14-16. Extending horizontally between these two opposite end frames, are four shafts 401, 402, 403 and 404. On these shafts are mounted various contact plates of different shapes as shown in the vertical sectional views Figs. 14, 15 and 16, and to these contact or conducting plates are attached wires leading from the various parts of the electrical apparatus as will presently be explained.

Mounted in the lower portion of the framework of the controller, is a rock shaft 405 which extends horizontally across the controller and has mounted upon it a plurality of contact arms the various shapes of which are shown in the figures referred to. A cross shaft 406 extending horizontally just above the shaft 405, connects all of these contact arms mechanically so that the rocking of the shaft 405 rocks all of these arms together from one side to the other, Fig. 14 showing the arms in the left-hand position and Fig. 15 in the right-hand position. The various contact arms carried by the rock shaft, and the various contact plates carried by the side cross shafts, are separated by suitable insulating material 407 clearly shown in all of the figures referred to. The rocking of the shaft 405 is accomplished by means of an arm 408 attached to the outer end of said shaft and connected to the aforesaid rod 47 which is separated from the foot pedal 42. Normally the rod 47 and the rock shaft 405 with its connected parts, are in the position shown in Fig. 16. This is the charging position when the pedal 42 is in its rearward or normal home position. When the foot pedal 42 is pushed forward for starting as previously explained, the rod 47 is pulled in the direction of the arrow in Fig. 16, which pulls the arm 408 downward and rocks the shaft 405 so as to carry the contact arms to the other shifted position as will more clearly be referred to later. Figs. 11 and 12 are top views of the controller where the operating arm 408 is at the right-hand side. Thus it will be seen that the position of the rock shaft 405 and the cross shaft 406 carrying the various rocking contact plates, is shown in Fig. 11 as in the charging position, whereas in Fig. 12 the operating arm 408 has been operated downward sufficiently to rock the shaft 405 and carry the cross shaft 406, with the various contact arms, in the opposite position, which is the starting position. The vertical sectional view taken for Fig. 16 is along the line 18—18 of Fig. 11, that is at the right-hand end of Fig. 11, looking in the direction of the arrows. Fig. 15 on the other hand, is a vertical section on the line 17—17 of Fig. 11, looking in the opposite direction as indicated by the arrows. Therefore Fig. 15 is also for the charging position of the parts, the cross shaft 406 being shown rocked to the right-hand side because of the direction of view being opposite to that of Fig. 16. Likewise Fig. 14 is a vertical cross section on the line 16—16 of Fig. 12 looking in the direction of the arrows. Since Fig. 12 is for the starting position, likewise Fig. 14 is therefore for the starting position as shown. It will be now readily understood that this system of contact arms which are oscillated back and forth about the rock shaft 405 as a pivot, and connected by the cross shaft 406, are the various contact strips which correspond to the previously described heavy lines and dotted lines in the diagrammatic Fig. 10 where the heavy lines have been assumed to be moved to the dotted line positions for the charging condition. Thus the movement of the rod 47 and the rocking of the shaft 405, moves this system of contact arms to one side or the other of this switch or controller, for the purpose of connecting the electrical devices for starting (when in the position of Fig. 12) and for charging (when in position shown in Fig. 11). These various oscillating contact arms have two varieties of shapes, one having an enlarged or expanded head as shown in Figs. 14 and 16, and the other a narrow head as shown in Fig. 15. The purpose of the wider or expanded head is to enable this connecting arm to bridge across between the two side contact plates as shown in Fig. 16, while the narrow head variety such as shown in Fig. 15, merely makes contact with one of the side strips thereby connecting that strip with this overlapping contact arm. These various side contact plates and the intermediate oscillating contact arms are numbered to correspond with the parts represented in diagrammatic Fig. 10. So that, for example, in Fig. 15 the right-hand side contact plate 206 represents the point 206 in the diagrammatic figure, the contact arm 207 is the part represented by dotted line 207 in Fig. 10 (also the heavy line 210 when shifted to the other position). And the right-angle plate 208 shown in Fig. 15 is a connecting plate corresponding to the point 208 in Fig. 10, which connects the swinging contact arm 207 with the lead wire 209. Without tracing out the similar parts for Figs. 14 and 16, it will be understood that the corresponding parts may be similarly identified with the parts shown in diagrammatic Fig. 10 and their identity will appear more clearly in connection with the ensuing description of the exact connections in this controller for the two different conditions of starting and charging. In order to set forth these connections more clearly, Figs. 11 and 12ᵃ are provided which correspond exactly with the positions of the parts in Figs. 11 and 12 respectively. Figs. 11ᵃ and 12ᵃ being diagrammatic. That is Figs. 11 and 11ᵃ represent the connections for charging, and Figs. 12 and 12ᵃ represent the connections for starting. In these two diagrammatic views, the heavier lines in each case are used to assist in distinguishing the electrical connections that are used. The parts are numbered just as they are numbered in diagrammatic Fig. 10 so that the connections may be readily traced by comparison of these two diagrammatic sets of circuits. For example, taking first the starting condition. This is represented in Figs. 12 and 12ᵃ by the heavy line connections in diagrammatic Fig. 10. Starting with the lower side of battery set No. 1, that is the right-hand set in Fig. 10, which lower side of the battery for convenience is marked with the negative sign, (—), this negative side of the battery is connected to the lead wire 230. Therefore in Fig. 12ᵃ the lead wire 230 is shown in the upper right-hand corner, (when this sheet of drawing is held so that the signatures thereon appear at the bottom) as coming from the negative side of battery No. 1 and attached to the side contact plate 231 which is the point 231 on diagrammatic Fig. 10. This plate 231 is connected by the connecting strap 232 with the next side contact plate 233 which is the point 233 on Fig. 10. The conducting strap or wire 232 is shown on Figs. 11 and 13 by a conducting collar extending between the two side contact plates 231 and 233. Then the curved connecting braces 234 on Fig. 12ᵃ represent the oscillating contact arm shown in heavy lines in Fig. 12 and connecting the point 233 with the point 235. This point 235 on Fig. 14ᵃ is a center contact strip which in reality is the lower part of the oscillating arm 234 and is connected by a conducting strip 235ᵃ (see also Fig. 13) to the wire 236 which leads to the plus side of battery set No. 2, the negative side of which is connected to the lead wire 237 of Fig. 10. This lead wire is shown just to the left of wire 236 in Fig. 12ᵃ and is connected to the side contact plate 238 which corresponds to the point 238 in Fig. 10 and also to the connecting wire 239 which leads to the shifting contact arm 240 (heavy line in Fig. 10). This conducting plate connects to the point 241 which has a connection 241ᵃ shown in Figs. 12ᵃ and 13, which connects to wire 242 leading to the positive side of battery set No. 3. Thence the circuit leads through the battery set No. 3, the negative pole of which is connected to the wire 243. This wire is shown at the left of wire 237 in Fig. 12ᵃ and is connected to the side plate 224 (point 224 in Fig. 10) and thence through the connecting strap 223 to the point 222 where the shifting contact arm 221 (heavy line in Fig. 10) connects to point 218 which in Fig. 12ᵃ and 13 is shown connected by strap 218ᵃ to the wire 219 which leads to the positive side of the battery set No. 4. Then the circuit leads through the battery to the wire 220 which of course is connected to the other parts of the electrical apparatus shown in Fig. 10 and not forming part of the switch controller. Then the circuit is completed through the wire 209 (shown to the left of wire 243 in Fig. 12ᵃ) which connects to the point 208 and thence by the conducting strap 210 to the point 211 which is connected to the common wire 212 leading back to the wire 253 which is shown in the lower right-hand corner of Fig. 12ᵃ and which extends to the positive side of battery set No. 1. It will thus be seen that this completes the circuit through the batteries in series such as described for the condition for starting; and the parts are numbered in this diagrammatic view Fig. 12 to correspond with the similar parts in diagrammatic Fig. 10 and also to the actual mechanical parts shown on Figs. 11–16.

The connections for the charging position will now be described with particular reference to Fig. 11ᵃ, supplemented by Fig. 11, Fig. 13 and diagrammatic Fig. 10. Starting with the motor-generator, at the brush 205, this brush is connected by wire 204 shown in Fig. 10, which wire is shown in the upper left-hand corner of Fig. 11ᵃ, attached to the side contact plate 203 which is the point 203 on Fig. 10. Then the center contact arm 202 (dotted line Fig. 10) connects across to the side contact plate 201 (point 201 Fig. 10), and this is connected directly to the wire 200 which is connected to the resistance coils 145 and 146 contained in the shunt-circuit of the generator as shown in Fig. 10. It will also be seen that the side contact plate 201 is directly connected with the iron wire resistance coil 170 (see also Fig. 10), which coil 170 extends across to the side contact plate 206 corresponding to point 206 in Fig. 10. Then the shifting central contact arm 207 (dotted line Fig. 10), connects across to the central contact plate 208 which is connected by strap 208ª with the previously described wire 209 which leads back to the main line of the motor-generator circuit, thus completing the shunt-field circuit with the iron wire coil 170 as a by-pass around the series coil as previously explained. Following now the main line of the motor-generator circuit, as it goes from the brush 205 through the series coil and through the lead wire 147 to the cut-out device shown in Fig. 10, this cut-out device is connected by the previously described wire 214 to the point 213. This wire 214 is shown in Fig. 11ª at the extreme left-hand upper corner attached to the side contact plate 213 (point 213 in Fig. 10). It will be seen in Fig. 11ª that the opposite end of this contact plate just mentioned is No. 211, this being mentioned previously in connection with 12ª as forming part of the circuit for the series position, and as seen in Fig. 10, the points 211 and 213 could of course be consolidated which in fact they are in the controller by being one and the same contact plate as shown. Referring now to Fig. 11ª it will be seen that this contact plate just above referred to as 213, is connected by the strap 212 which extends across to the other side of the controller to the side contact plate 215. This strap 212 (see also Figs. 11 and 13) is the common wire for the positive side of the batteries arranged in multiple series and it will further be seen by reference to Figs. 11ª, 11 and 13, that this strap 212 is continued by the connecting strap 212ª to connect with the side contact plates 251 and 252. These side contact plates 215, 251 and 252 represent the respective connecting wires for the same numbers on Fig. 10. They lead respectively to the oscillating contact arms 217, 240 and 234, which connect respectively with the central contact plates or points 218, 241, and 235. The point 218 (Fig. 11ª) is connected by the strap 218ª, as previously explained, to the lead wire 219 which extends to the positive side of battery set No. 4. Similarly point 241 is connected by the strap 241ª to the lead wire 242 which extends to the positive side of battery set No. 3. The point 235 is connected by the aforementioned strap 235ª to the lead wire 236 which connects with the positive side of battery set No. 2. It will be seen that the wire 253 is connected to the side contact plate 252 in the lower right-hand corner of Fig. 11ª and leads to the positive side of battery set No. 1. By this construction it is obvious that the lead wire 214 coming from the main generator circuit (when the cut-out is closed), is connected to the positive sides of all four sets of cells through the common wire 212 and its connections. Now the other side of the main line is connected to the negative sides of these battery sets by means of the lead wire 147. This wire is shown in the middle lower portion of Fig. 11ª, attached to the side contact plate 226 (point 226 in Fig. 10). There is also attached at this same point the lead wire 220 which as previously explained connects the common wire 147 with the negative side of the battery set No. 4. (It will of course be understood that these positive and negative terms are used for the sake of convenience in designation.) The side plate 226 is connected by the double width central contact arm 225 (see also Fig. 14) with the opposite side contact plate 224 to which is attached the lead wire 243 extending to the negative side of battery set No. 3. Then it will be seen that the plate 224 is connected to the strap 147ª (see also Figs. 11 and 13) which is this same common wire 147 shown in Fig. 10. This strap 147ª is cross-connected to the side contact plate 256 which in turn is connected by the double width shifting contact arm 254 (dotted lines Fig. 10). This connects up to the side plate 238 from which extends the wire 237 connected to the negative side of battery set No. 2. The plate 238 is cross-connected by strap 147 to the opposite side of the controller, side plate 257. This plate is connected by the double width shifting contact arm 255 (see also Fig. 16), to the opposite contact plate 231 which is connected to the lead wire 230 extending to the negative side of battery set No. 1. Thus it will be seen that the common wire 147, with its connections, couples up the negative sides of all four sets of batteries so that in this way the batteries are arranged in multiple of four sets, each set being comprised of three cells in series for the purpose previously explained. Any other grouping of cells that may be desired, may be used in this multiple-series arrangement, but in the construction as I have adopted it, I gain the advantages of a single switch or controller which may be manipulated to one or the other of its two positions, in one of which all of the cells are arranged in series for high voltage for starting purposes, and the other position throws the cells into this multiple-series arrangement for charging. At the same time this single switch controller throws into operation the differential field for charging and the series field for starting, as well as bringing in the iron wire by-pass control. This makes a very simple operation in connection with the starting pedal so as to perform all of these electrical connections and gain their ensuing advantages, by the simple movement of a single operating member. From what has been said above, it will be apparent that the effect of this iron wire resistance, in connection with the charging operation, is to disable the regulating effect of the opposed series field for the low speeds of driving. This permits quick charging of the battery. But, as soon as the driving speed rises to the desired point, and the current reaches a determined point, the inherent characteristics of the iron wire are such that this disabling effect is in itself rendered ineffective. In this way, the iron wire, at the early stages of low speed, constitutes the generator as a plain shunt wound generator, or at least it has the characteristics of such a shunt wound machine; whereas, as soon as the current gradually rises toward its maximum, this regulating action of the opposing series field is now automatically thrown into operation, just as in low speeds it was automatically thrown out of operation. Furthermore, it will be seen that these devices are so arranged that for the starting operation, this iron wire resistance is entirely cut out of the circuit,—that is, it is cut out of operation during the starting operation, so that it is effective merely for the charging operation. The advantage of this is that for the starting operation, the series field is now operating at its full intensity, which would not occur if the iron wire were left in the circuit at this time and could short-circuit the current therethrough. This really results in three stages or conditions, namely, for the starting operation, a field of relatively high intensity for motor purposes. Then a second stage during the charging operation for low speed of driving, wherein there is no regulation of the generating current (that is in the present arrangement the iron wire has practically eliminated the bucking effect of the series field.) And finally the third stage, during the charging operation of high speeds of driving, wherein there is current regulation (viz. the iron wire is heated up and thereby automatically throws in the bucking effect of the series field, to oppose the shunt field and thus accomplish the regulation referred to). Thus, the iron wire constitutes means independent of the field coils themselves, for making the generator charge at lower speeds than as if the field coils alone were used.

While the form of mechanism herein shown and described, constitutes a preferred form of embodiment of the invention it is to be understood that other forms might be adopted all coming within the scope of the claims which follow.

In the claims certain terms are used as designating various elements of the combination, but it is to be understood that these terms are to be given broad scope in interpreting the spirit of the invention. For example where the term "engine" is used, it is to be understood that this device is applicable to other forms of power-driven machines where the prime mover may be of the non-self-starting type and it is necessary to use an auxiliary driving source to start the apparatus initially. Similarly the word accumulator is used in the claims with reference to the storage batteries which have been hitherto referred to in the above description. The foot pedal which operates the starting and charging connections is referred to in the claims as an operating member, since various forms of operating devices of this sort might be used. The switch controller constitutes broadly a means for shifting the various electrical connections, as referred to in the claims and it also has a broad aspect as a mechanical means having two operative positions in one of which positions one set of connections is established, and in the other position the other connections are established, all of these being worked out and reduced to the simple mechanical operation of this single switch to control all of these complicated electrical connections. The claims also refer to the arrangement of the various cells in series, various arrangements of this sort being of course possible under the terms of the claims and within the scope of the invention. And the same is true of the parallel arrangement, which may be varied,—the aim being to change the voltage, or more generically, to change the wattage, that is, to change the energy relations between the power which is utilized during the starting operation, and the power utilized for the charging operation. It will be seen that the result of what has been set forth above is that the battery constitutes a source of power to be drawn upon for the purpose of cranking the engine, and then the engine when running, stores this power back into the batteries; but in order to do this most advantageously, there is interposed between the battery and the engine these electrical power-translating devices, (in my specific form the motor-generator with its connections); the circuit for carrying the electric current back and forth between the battery and these electrical power-translating devices being so arranged that the current is taken from the batteries through the electrical devices at high wattage for cranking the engine, whereas for the charging or storing operation, the current is put back into the batteries at relatively lower voltage or wattage. Of course, it will furthermore be apparent that these advantageous results are increased by combining with these devices, the arrangements for using one gear ratio for the starting operation, and a different gear ratio for the charging operation, so as to permit transmitting the high torque effect to the engine for cranking purposes, through the appropriate gear ratio, and then having the engine perform the charging operation with a relatively low speed effect through another gear ratio. The two sets of gearing between the engine and motor-generator being at different ratios of gearing respectively are referred to in the claims as differential gearing. However, while the change of gearing (between starting and charging) is advantageous, it is not essential in all cases, and some of the claims refer merely to the mechanical connections between the engine and the motor-generator, without desiring to be limited to any particular kind of such connections. It may also be stated that the description of the motor-generator fields given above, is that of a preferred form, as using the series field for starting and the differential arrangement for charging, but it is to be understood that other arrangements might be used in connection with other phases of the invention, the preferred form herein referred to being serviceable to provide a relatively strong field for starting and a field of weaker intensity for the charging operation.

What is claimed is as follows:

1. In a device of the character described, the combination with an engine, a motor-generator, and connections between the engine and motor-generator for starting the former by the latter and running the latter by the former; of an accumulator comprising a plurality of electric cells connected with said motor-generator; and an operating member having a normal position for arranging the cells in multiple series with the motor-generator for charging, and movable to another position for arranging said cells in series for operating the motor-generator as a motor for starting; and means for resisting the movement of said operating member out of its normal position, and adapted to automatically return said member to its normal position when released.

2. In a device of the character described, the combination with an engine, a motor-generator, and connections between the engine and motor-generator for starting the former by the latter and running the latter by the former; of an accumulator comprising a plurality of electric cells connected with said motor-generator; and an operating member having a normal position, but movable to a different position to arrange the cells in series for operating the motor-generator as a motor for starting purposes; and means for automatically re-arranging said cells in multiple series for charging purposes, when the controlling means is moved from its displaced position.

3. In a device of the character described, the combination with an engine, a motor-generator, and connections between the engine and motor-generator for starting the former by the latter and running the latter by the former; of an accumulator comprising a plurality of electric cells connected with said motor-generator, said cells having a normal position of arrangement and being adapted for arrangement in series for operating the motor-generator as a motor for starting, and in multiple series for charging by the motor-generator; and means for controlling the arrangement of said accumulator cells and automatically restoring said cells to their normal arrangement.

4. In a device of the character described, the combination with an engine, a motor-generator, and a mechanical connection between the engine and motor-generator for starting the former by the latter and running the latter by the former; of an accumulator comprising a plurality of electric cells connected with said motor-generator; a switch controlling the arrangement of said cells in series for operating the motor-generator as an engine cranking motor and in multiple series for charging by the motor-generator; means automatically tending to maintain said switch in a determined position; and a manually operable controlling member adapted to throw said switch from said position.

5. In a device of the character described, the combination with an engine, a motor-generator, and connections between the engine and motor-generator for starting the former by the latter and running the latter by the former; of an accumulator having a plurality of circuit connections with said motor generator, certain of said circuit connections being adapted to transmit high wattage from the accumulator to the motor-generator for starting purposes, and other of said circuit connections being adapted to transmit low wattage from the motor-generator to the accumulator for charging purposes; and a controlling member having a normal position, for selecting the low wattage circuit connection for charging purposes, but movable to a different position to select the high wattage circuit connection for starting purposes; with provisions for automatically restoring said controlling member to normal position.

6. In a device of the character described, the combination with an engine, a motor-generator having series and shunt fields differentially wound, and connections between the engine and motor-generator for starting the former by the latter and running the latter by the former; of an accumulator comprising a plurality of cells; and a common operating member for connecting the cells in series with the series field, for operating the motor-generator as a motor for starting, and connecting the cells in multiple series with the differential field windings for charging by the motor-generator.

7. In a device of the character described, the combination with an engine, a motor-generator having a plurality of field windings, and connections between said engine and said motor-generator for starting the former by the latter and running the latter by the former; of an accumulator comprising a plurality of cells adapted to be arranged in different voltage combinations; and a controlling member operable to one position to select one arrangement of the field windings concomitantly with one voltage combination of said cells for starting; and means for automatically restoring said operating member to normal position in which it selects another field winding arrangement concomitantly with a different voltage combination of said cells for charging purposes.

8. In a device of the character described, the combination with an engine, a motor-generator having a plurality of field windings, connections between the engine and motor-generator for starting the former by the latter and running the latter by the former; of an accumulator having a plurality of circuit connections with the motor-generator; and an operating member operable to one position to arrange the field windings of the motor-generator to secure a field of relatively high intensity and concomitantly select the circuit connections of the battery to give high wattage for starting, and operable to another position to change the field arrangements to secure a field of less intensity and concomitantly select other circuit connections, whereby the motor generator may charge the accumulator at low wattage.

9. In a device of the character described, the combination with an engine, a motor-generator having field windings for producing a motor field and a generator field, and a mechanical connection between the engine and the motor-generator for starting the former by the latter and running the latter by the former; of an accumulator comprising a plurality of electric cells adapted for series or multiple-series arrangement; an operating member operable on starting to connect the motor field windings of the motor-generator with the series arrangement of said cells, with automatic provisions to restore the operating member to connect the generator field windings with a multiple series arrangement of said cells for charging by the motor-generator.

10. In a device of the character described, the combination with an engine; a motor-generator having a shunt field winding and a series field winding, said shunt field winding to be used when the motor-generator is operated as a generator for charging, whereby a relatively low intensity of field will be secured, and the series winding to be used when the motor-generator is to be employed as a motor for starting purposes, whereby a field of relatively high intensity will be secured; connections between the engine and motor-generator for starting the former by the latter and running the latter by the former; of an accumulator having a plurality of circuit connections, certain of said circuit connections being adapted to transmit high wattage from the accumulator to the motor-generator for starting purposes, and other of said circuit connections being adapted to transmit low wattage from the motor-generator to the accumulator for charging purposes; and a controlling member operable to one position for starting to selectively connect the high wattage circuit connections with the relatively high intensity field winding and to another position for charging to selectively connect the low wattage circuit connections with the relatively low intensity field winding.

11. In a device of the character described, the combination with an engine, a motor-generator, and intermediate connections between the engine and motor-generator for starting the former by the latter and running the latter by the former; of an operating member for controlling said intermediate connections; an accumulator comprising a plurality of electric cells connected with said motor-generator; and means connected with said operating member for arranging said cells in series for operating the motor-generator as a motor for starting, and in multiple-series for charging by the motor-generator.

12. In a device of the character described, the combination with an engine, a motor-generator having differential series and shunt field windings, and intermediate connections between the engine and motor-generator for starting the former by the latter and running the latter by the former; of an operating member for controlling said intermediate connections; an accumulator; and means connected with said operating member for connecting said accumulator to the series field winding of the motor-generator for starting the engine, and to the differential field windings for charging the accumulator by the motor-generator.

13. In a device of the character described, the combination with an engine, a motor-generator having differential series and shunt field windings, and intermediate connections between the engine and motor-generator for starting the former by the latter and running the latter by the former; of an operating member for controlling said intermediate connections; an accumulator comprising a plurality of electric cells; and means connected with said operating member for arranging said cells in series for operating the motor-generator as a motor for starting and in multiple-series for charging by the motor-generator, and also for connecting said accumulator to the series field winding of the motor-generator for starting the engine and to the differential field windings for charging the accumulator by the motor-generator.

14. In a device of the character described, the combination with an engine, a motor-generator, and two sets of connections between the engine and the motor-generator, the first for starting the engine by the motor-generator and the second for running the motor-generator by the engine; of an operating member operable to two positions, one for throwing in the said first set of connections and the second position for throwing in said second set of connections; an accumulator comprising a plurality of electric cells; and means connected with said operating member for arranging said cells in series for operating the motor-generator as a motor when the said member is moved to its first position for coupling up the starting connections, and for arranging said cells in multiple-series for charging when the said member is moved in its second position for coupling said second set of connections.

15. In a device of the character described, the combination with an engine, a motor-generator having differential shunt and series field windings, and two sets of connections between the engine and the motor-generator, the first for starting the engine by the motor-generator and the second for running the motor-generator by the engine; of an operating member operable to two positions, one for throwing in the said first set of connections and the second position for throwing in said second set of connections; an accumulator with circuit connections to the motor-generator; and means connected with said operating member for connecting said accumulator to the series field of the motor-generator when the first set of connections is coupled by said member for starting the engine, and for connecting said accumulator to the differential field windings when said member is in said second position for coupling said second set of connections for charging the accumulator by the motor-generator.

16. In a device of the character described, the combination with an engine, a motor-generator, intermediate gearing connections between the engine and motor-generator for starting the former by the latter and running the latter by the former, means for changing the gearing ratio of said intermediate connections for the starting and the charging operations, and an accumulator comprising a plurality of cells; of means for arranging said cells in series for operating the motor-generator as a motor for starting, and in multiple series for charging by the motor-generator.

17. In a device of the character described, the combination with an engine, and a motor-generator; of differential gearing connecting the engine and the motor-generator at one ratio for starting the engine by the motor-generator and a different ratio for operating the motor-generator by the engine for charging; an accumulator connected with the motor-generator; and means for changing voltage arrangements of the accumulator in correspondence with changes in the differential gearing connections, whereby to utilize one voltage for starting through one gear ratio and to drive through the other gear ratio to charge at a lower voltage.

18. In a device of the character described, the combination with an engine, a motor-generator, intermediate gearing connections between the engine and motor generator for starting the former by the latter and running the latter by the former, and an accumulator comprising a plurality of cells; of a common operating member for concomitantly selecting for starting one gearing ratio of said intermediate gearing connections and arranging said cells in series, and also for selecting for charging another ratio of said gearing connections and arranging said cells in multiple series; with provisions for automatically restoring said operating member to normal charging position.

19. In a device of the character described, the combination with an engine, a motor-generator having field windings for producing a motor field and a generator field, differential gearing between said engine and said motor-generator for starting the former by the latter at one ratio of speed, and running the latter by the former at a different ratio of speed, and an accumulator comprising a plurality of electric cells; of means for concomitantly selecting, for starting purposes, the motor field windings of said motor-generator, the starting ratio of said differential gearing, and a series arrangement of cells of said accumulator, and also for concomitantly selecting, for charging purposes, the generator field windings of said motor-generator, the charging ratio of said differential gearing and a multiple-series arrangement of the cells of the accumulator.

20. In a device of the character described, the combination with an engine, a motor-generator having a plurality of field windings, differential gearing between said engine and said motor-generator for starting the former by the latter at one ratio of speed, and running the latter by the former at a different ratio of speed; of an accumulator comprising a plurality of electric cells; and means operable to connect the engine and motor-generator as a motor, through said differential gearing, and to select certain of the field windings to provide the motor-generator with a high intensity field and to arrange the battery cells in series, when the motor-generator is to be used as a motor for starting purposes, said means being operable to another position to connect the engine with the motor-generator through different gearing connections and to select different field arrangements, whereby the machine will operate with a relatively low intensity field and to arrange the accumulator in parallel for charging, when the machine is to be operated as a generator.

21. In a device of the character described, the combination with an engine, a motor-generator having series and shunt field windings, and connections between the engine and motor-generator for starting the former by the latter and running the latter by the former; means for selecting said series winding for starting, and for selecting said shunt and series windings differentially arranged for charging, whereby said series winding will regulate the field; of an accumulator connected with the motor-generator; and an automatically variable resistance forming a by-pass around said series field of the generator and operating to weaken the effect of said series field during low speed generating.

22. In a device of the character described, the combination with an engine, of a motor-generator having series and shunt fields differentially wound; connections between the engine and motor-generator for starting the former by the latter and running the latter by the former; an accumulator connected with the motor-generator; a by-pass circuit around said series field winding, including means operating to control the regulating effect of said series winding upon the shunt winding when the machine is operating as a generator; and means for rendering said by-pass circuit ineffective when the motor-generator is used for starting purposes.

23. In a device of the character described, the combination with an engine, of a motor-generator having series and shunt fields differentially wound; mechanical connections between the engine and motor-generator; a by-pass circuit around said series field winding including a resistance element which is controlled by the current flow therethrough, said element operating to increase the rate of charging of the accumulator for low speeds of the generator; and means for rendering said by-pass circuit ineffective when the motor-generator is used for starting.

24. In a device of the character described, the combination with an engine, a motor-generator having differential series and shunt field windings, and connections between the engine and motor-generator for starting the former by the latter, and running the latter by the former, and an accumulator connected with the motor-generator; means for selecting said series winding for starting, and for selecting said differential windings for charging whereby said series winding will regulate the charging field; automatic means adapted to render the series field winding ineffective during low speed generating; and means adapted to render said last-mentioned means ineffective during the motor operation of the motor-generator.

25. In a device of the character described, the combination with an engine, a motor-generator having series and shunt field windings, with provisions for selecting said windings in differential relation for charging; connections between the engine and the motor generator for starting the former by the latter and running the latter by the former; and an accumulator connected with the motor generator; of means adapted to vary the regulating effect of the series field winding during the generating period; and means for rendering said last mentioned means ineffective during the starting period.

26. In a device of the character described, the combination with an engine, a motor-generator, and connections between the engine and the motor-generator for starting the former by the latter and running the latter by the former, and an accumulator having electrical connections with the motor-generator; of means for regulating the current output during a determined range of speed of the generator; automatic means for disabling said regulating means during another range of generator speed in the generator operation; and means for changing the electrical connections to provide for an unregulated flow of current from the accumulator through the motor-generator to operate the machine as a high torque motor for starting purposes.

27. In a device of the character described, the combination with an engine, of a storage battery; electrical power transmitting devices interposed between the engine and battery and having dual characteristics to translate the electric power of the battery into mechanical power to start the engine and to translate the mechanical power of the running engine into electric current for storage back into the common battery; two sets of gearing connecting the said electric devices and said engine, one set for cranking the engine at high leverage and the second set for driving by the engine for charging; and two separate circuit connections between said electrical devices and the battery, having provisions associated with the first for taking high wattage current from the battery to crank the motor through said high leverage gearing, and with the second circuit for delivering low wattage current to charge the battery by using said second set of gearing.

28. In a system of the character described, the combination with an internal combustion engine, of a lighting system therefor including electric lamps adapted for relatively low voltage current; a storage battery connected with said lighting system; electrical connections connected with said battery; a high leverage gearing connected with said engine; a lower leverage gearing connected with said engine; and means including electrical power-transmitting devices connected with said gearing and said electrical battery connections for translating relatively high wattage current from said battery into mechanical power applied to said engine through the high ratio gearing to start the engine, and for translating power derived from the engine through the lower ratio gearing, to charge said storage battery with current of lower wattage and of substantially the same voltage as that of the lighting system.

In testimony whereof I affix my signature in the presence of two subscribing witnesses.

CHARLES F. KETTERING.

Witnesses:
J. B. HAYWARD,
CHAS. D. BRONSON.

Copies of this patent may be obtained for five cents each, by addressing the "Commissioner of Patents, Washington, D. C."